(12) United States Patent
Lengsfeld et al.

(10) Patent No.: US 11,989,889 B2
(45) Date of Patent: May 21, 2024

(54) METHOD FOR DETERMINING A RELATIVE MOVEMENT USING A DIGITAL IMAGE SEQUENCE

(71) Applicant: Robert Bosch GmbH, Stuttgart (DE)

(72) Inventors: Alexander Lengsfeld, Bad Muender (DE); Joern Jachalsky, Wennigsen (DE); Marcel Brueckner, Sunnyvale, CA (US); Philip Lenz, Holle (DE)

(73) Assignee: ROBERT BOSCH GMBH, Stuttgart (DE)

( * ) Notice: Subject to any disclaimer, the term of this patent is extended or adjusted under 35 U.S.C. 154(b) by 607 days.

(21) Appl. No.: 17/278,006

(22) PCT Filed: Oct. 29, 2019

(86) PCT No.: PCT/EP2019/079550
§ 371 (c)(1),
(2) Date: Mar. 19, 2021

(87) PCT Pub. No.: WO2020/119997
PCT Pub. Date: Jun. 18, 2020

(65) Prior Publication Data
US 2021/0350548 A1    Nov. 11, 2021

(30) Foreign Application Priority Data
Dec. 13, 2018  (DE) .......................... 102018221617.7

(51) Int. Cl.
*G06T 7/215* (2017.01)
*G06T 7/73* (2017.01)

(52) U.S. Cl.
CPC ................ *G06T 7/215* (2017.01); *G06T 7/73* (2017.01); *G06T 2207/10016* (2013.01)

(58) Field of Classification Search
CPC . G06T 7/73; G06T 7/215; G06T 2207/10016; G06V 20/56; G06V 20/58; G06V 20/588; G06V 10/22
See application file for complete search history.

(56) References Cited

U.S. PATENT DOCUMENTS 9,008,363 B1 *   4/2015   Klier ....................... G06T 7/269
                                                        382/103
9,925,939 B2 *   3/2018   Rosenbaum .......... B60R 21/013
(Continued)

FOREIGN PATENT DOCUMENTS

DE    102011006629 A1   10/2012
JP       2004355082 A   12/2004
(Continued)

OTHER PUBLICATIONS

International Search Report for PCT/EP2019/079550, dated Jan. 10, 2020.
(Continued)

*Primary Examiner* — Daniel G Mariam
(74) *Attorney, Agent, or Firm* — NORTON ROSE FULBRIGHT US LLP; Gerard A. Messina (57) ABSTRACT

A method for determining a movement of a device relative to at least one object based a digital image sequence of the object recorded from the location of the device. The method includes computing a plurality of optical flow fields from image pairs of the digital image sequence; finding the position of an object in a partial image region in the most current image in each case and assigning the partial image region to the object; forming a plurality of partial optical flow fields from the plurality of optical flow fields; selecting a partial flow fields from the plurality of partial flow fields in accordance with at least one criterion to facilitate the estimation of a change in scale of the object; and estimating (Continued)

the change in scale for the at least one object using the assigned partial image region based on the selected partial flow field.

12 Claims, 2 Drawing Sheets

(56) References Cited

U.S. PATENT DOCUMENTS

| | | | |
|---|---|---|---|
| 10,155,506 B2* | 12/2018 | Dagan | ................ G06V 20/58 |
| 2010/0027844 A1 | 2/2010 | Akita | |
| 2012/0019655 A1 | 1/2012 | Fukamachi et al. | |
| 2012/0314071 A1 | 12/2012 | Rosenbaum et al. | |
| 2017/0203744 A1 | 7/2017 | Dagan | |

FOREIGN PATENT DOCUMENTS

| | | |
|---|---|---|
| JP | 2010039634 A | 2/2010 |
| JP | 2011048420 A | 3/2011 |

OTHER PUBLICATIONS

Giachetti, A. et al., "Dynamic Segmentation of Traffic Scenes," Proceedings of the Intelligent Vehicles '95. Symposium, 1995, pp. 258-263.

Lei Chen et al., "Real-Time Optical Flow Estimation Using Multiple Frame-Straddling Intervals," Journal of Robotics and Mechatronics, vol. 24, No. 4, 2012, pp. 686-698, <https://www.fujipress.jp/main/wp-content/themes/Fujipress/pdf_subscribed.php> Downloaded Mar. 17, 2021.

* cited by examiner

FIG. 1

METHOD FOR DETERMINING A RELATIVE MOVEMENT USING A DIGITAL IMAGE SEQUENCE

FIELD

The present invention relates to a method for determining a movement of a device relative to at least one object using a digital image sequence.

BACKGROUND INFORMATION

Driver assistance systems record scenarios with the aid of electronic systems that collect and process data by radar, lidar, ultrasound or camera systems, for example, to compute characterizing parameters for movements of such devices relative to other objects. The data can also be processed as a function of the electronic system used, on the basis of three- or two-dimensional models. In a radar system where it is inherent to the system that distances are recorded, a three-dimensional model lends itself for analysis.

In monocular digital camera systems, the apparent movement of the object in an image sequence can be analyzed on the basis of two-dimensional image coordinates. A movement of a device relative to at least one object can take place, for example, on the basis of a scaling change of object detections or be based on a scale change estimation of an optical flow from the image sequences.

The estimation of the relative movement as a function of the scaling change of object detections is subject to a number of inaccuracies, such as, for example, the often faulty assumption of known and fixed object widths, or inaccuracies arise due to the variation in the extent of the object in successive camera images.

When estimating the change in scale using the optical flow, the optical flow belonging to the target object must be selected from the flow fields, which can be done via movement segmentation. The movement segmentation of the optical flow is neither a trivial nor a computationally intensive problem. Often, the requisite computing capacity is not available for embedded systems in the automotive sector, in particular. The ensuing results are typically quite noisy, so that subsequent computations must process a considerable number of outliers. From such scaling changes, a collision time TTC (time-to-collision or time-to-contact), especially between vehicles, may then be derived as a characterizing parameter. The optical flow estimation is thereby typically computed at a fixed time interval over the entire image.

German Patent Application No. DE 10 2011 006 629 A1 describes a method for determining the collision time of a vehicle equipped with a video system on the basis of an evaluation of video images of the vehicle environment, a collision parameter TTC for determining the collision time of the vehicle being computed using any part of the vehicle environment. Collision parameter TTC is computed by integrating the expansion rate of the optical flow field of the entire vehicle environment recorded by the video system in the video image. The invention also relates to a vehicle guidance system for implementing the method.

It is an object of the present invention to provide a method for determining a movement of a device relative to at least one object using a digital image sequence that will make it possible to achieve high accuracy with little computing power when estimating the relative movement and, furthermore, to compute other characterizing parameters for the relative movements from a measure of the estimated relative movement.

SUMMARY

In accordance example embodiments, the present invention provides a method, a system, as well as a computer program product and a machine-readable storage medium for determining a movement of a device relative to at least one object on the basis of a digital image sequence of the object recorded from the location of the device which at least partially has the mentioned effects.

Advantageous embodiments of the present invention are disclosed herein.

The present invention is based on the realization that an image formed of objects that are further away from the device is smaller than that of near objects in an image of a sequence of images that a camera recorded in perspective, for example. For that reason, the present invention provides that optical flow fields from image pairs of such an image sequence be computed at different relative time intervals and at different values, the partial area on the images, in which the object is imaged, being taken into account. This partial area, in which the object is imaged, may also be referred to as "bounding box" or as "region of interest ROI." Suitable flow fields for determining relative movements are subsequently selected from a plurality of flow fields on the basis of criteria which improve the reliability and accuracy of this estimation.

In the method according to an example embodiment of the present invention, a movement of a device relative to at least one object is determined on the basis of a digital image sequence of the object recorded from the location of the device. As an example, the device may be a motor vehicle that, itself, features a movement relative to a ground. However, the device may also be a stationary device, relative to which, an object, such as a motor vehicle, moves.

For this determination, a plurality of optical flow fields are computed from image pairs of the digital image sequence, the image pairs being formed from a most current image, and images of the image sequence being formed at different time intervals relative to this most current image. The optical flow thereby describes the displacement of the pixels of an object recorded at an instant i in an image of an image sequence in relation to the pixels recorded at instant j, on the basis of flow vectors which are assigned to the current pixels and thus define the optical flow field.

Furthermore, in the method according to an example embodiment of the present invention, the position of at least one object, whose relative movement is to be determined, is found in the most current image in a partial image region of the digital image sequence, and this partial image region is assigned to the object. Thus, a region is identified for each image in the image sequence in which the object was detected and, for the further computations, it suffices to consider this partial image region ROI (region of interest) which characterizes the object. For this, a rectangular area, which is substantially congruent with the object, is typically assigned thereto. Alternatively, the partial image region may also be derived from a "semantic segmentation." In another embodiment of the present invention, the position of the at least one object may only be found for selected images of the image sequence. If the position of a plurality of objects is found in the most current image in the particular case, the objects may be tracked throughout the entire process by assigning a partial image region to an object, using the assigned partial image regions.

From the plurality of optical flow fields, a plurality of optical partial flow fields are formed, a particular partial flow field resulting as an intersection of one of the flow fields of the plurality of flow fields with the partial image region of the most current image of the image sequence. The computation of the flow field is based on the most current image of the image sequence, and the flow field is computed using the other image of the image pair which has the time interval corresponding to the current image. The object was configured in the partial image region in the current image, and the intersection of this partial image region of the image with the flow field, which was computed on the basis of this most recent image, determines the partial flow field that is assigned to the flow field.

From this plurality of partial flow fields, at least one partial flow field is selected in accordance with at least one criterion to facilitate the estimation of a change in scale of the object.

The change in scale of the at least one object is estimated on the basis of the at least one selected partial flow field. Pairs of flow vectors, which are used to compute the scaling change, are generated for the estimation of the change in scale. Thus, it is beneficial for the scale estimation when a suitable partial flow field is selected because the scale estimation is based on this partial flow field.

When a plurality of objects are configured in the image sequence, the method is performed for each object. This means that a suitable partial flow field is selected for each object on the basis of the criteria. Thus, each object, respectively each corresponding partial image region is uniquely identified as a function of the assignment.

Thus, to estimate the change in scale of objects, which are at different distances from the device and thus are variably imaged in the images of the image sequence, this method makes it possible for the most suitable partial flow field to be selected in accordance with predefined criteria.

The quality of the scaling computation is, therefore, improved by selecting the most suitable optical partial flow field from different time intervals. This is because if an object is more distant from the device, for example, a longer flow vector may be used for the estimation by selecting a flow field at a longer time interval between the images of a corresponding image pair, for example. Thus, to estimate the change in scale, a different time interval may be used to compute the optical flow at instant i than at instant j.

An example embodiment of the present invention provides that the criterion for selecting a partial flow field take into consideration the degree of overlap of the partial image region with the computed flow field. It is thus ensured that the object is configured in an image region within the computed flow field and that a sufficient portion of the object, which is represented by the partial image region, may be taken into account. This may be especially important if, for example, the flow field is not computed for the entire area of the images of the image sequence to reduce the computational outlay, for example. This will be explained in greater detail below. Additionally or also alternatively, the criterion may take into account an absolute value of the intersection of the partial image region with the computed flow field, since, if indicated, this overlap area, which is formed from this intersection area, becomes so large that the flow vectors situated within this overlap suffice for estimating the change in scale.

Another example embodiment of the present invention provides that the criterion for selecting a partial flow field take into consideration a value of a signal-to-noise ratio of flow vectors of the partial flow field and additionally or alternatively a quality measure from the computation of the flow vectors. A reliability is thereby provided by the quality of the partial flow field either through a determined signal-to-noise ratio of the flow vectors or also through a quality value that was determined in the computation of the flow vectors. In addition, the criterion for selecting a partial flow field may additionally or alternatively take into consideration the number of flow vectors in the partial flow field and/or the length of the flow vectors of the partial flow field. The validity of flow vectors themselves is essentially thereby determined by the signal-to-noise ratio, provided that no other quality measure is available. The higher the number of such flow vectors, the more reliable and robust is the estimation of the change in scale. Accordingly, the length of the flow vectors may improve the estimation of the change in scale to a certain extent.

Another example embodiment of the present invention provides that the criterion for selecting a partial flow field take into consideration a detection quality of the position finding of the object in the partial image region of the image of the image sequence. If the position of an object in a partial region of an image is found with certainty, the correct flow vectors are also selected in the partial flow field, which improves the estimation.

Additionally or alternatively, the criterion may also take into consideration characteristics of the image regions at the intersection of the partial image region and the computed flow field. Thus, the properties of an image of the sequence of images also enter into the selection of the partial flow fields which have an obvious influence on the quality of the flow vectors, for example. These may include contrasts, homogeneity, gray scale distribution, gradients or even more complex features such as a histogram of oriented gradients HOG, where the distribution of local intensities or the configuration of edges is evaluated, and similar variables that characterize the significance of the image.

An example embodiment of the method according to the present invention provides that the criterion for selecting a partial flow field satisfy the inequality:

$$FV > \text{alpha} * (SZ/SZ_{MAX}) * FV_{MAX}$$

and additionally take into consideration the value of the time interval used to compute the partial flow field. This criterion primarily evaluates the number of flow vectors in the partial flow field in comparison to the number in the other partial flow fields. This formula is derived further below in this Specification. The value of the time interval is taken into consideration in such a way that the partial flow field, which was computed at the longer time interval, is preferred from among the plurality of partial flow fields.

One example embodiment of the present invention provides that the plurality of optical flow fields be computed from an image detail of the images of the image pairs, the image detail representing a partial area of the particular images. Thus, in an application of the method where the object is a vehicle, for example, which moves relative to the device on a ground ahead of the device, the device is shown in another image detail of an image of an image sequence at a greater distance than an object located within a near range ahead of the device.

This makes it possible to select the scene to be observed already upon computation of the optical flow fields and thereby save computational effort since the flow field is computed over a limited image area. Thus, for example, an image of the sky on the image sequence may be masked out, or if the object to be estimated is expected in the near or far range of the device, the image detail may be selected accordingly.

In accordance with an example embodiment that enhances the present invention, the plurality of optical flow fields is computed for at least two distinguishable image details of the images of the image pairs and each at different time intervals.

This assignment of the particular image detail to a time interval for computing the flow fields makes it possible to use time intervals for the corresponding image regions in which objects are imaged from different distances ahead of the device and thus reduce the computational effort without any loss of quality. This is because the smaller partial image regions of distant objects require longer time intervals for a robust estimation, and because short time intervals are required for the corresponding timely reaction in the near range. Thus, both computational outlay is saved, and adapted computations are performed.

Another example embodiment of the present invention provides that the at least two distinguishable image details be configured on the images of the image pairs relative to the configuration and value thereof in accordance with perspective aspects, for the localization of objects at different distances from the device.

The partial image region of an image in which distant objects are imaged ahead of the device is appreciably smaller than in the case of objects in the near range ahead of the device, provided that the objects move on an essentially planar surface ahead of the device. If these perspective conditions are taken into account, for example, an image detail for more distant objects may be placed at a smaller size and further toward the top edge of the images of the image sequence than an image detail for objects in the near range of the device.

An example embodiment of the present invention provides that the at least two image details be distinguishable by the areal extent thereof, that the smaller image detail be configured completely within the larger image detail, and that the respectively assigned time interval for computing the flow fields be all the greater, the smaller the image detail is. This embodiment of the present invention combines both the advantage from the perspective view and the longer time interval which is favorable for estimating the change in scale.

An example embodiment of the present invention provides that a plurality of optical flow fields be computed from image details of the image pairs, the image details and/or the assignment thereof to time intervals of the image pairs each being determined in accordance with the recording of the particular image sequence.

In the current method, this makes it possible for the parameters used to compute the flow fields, such as the position, the value and the associated time interval, for example, to be adapted on the basis of information from the position finding of objects, for example.

Moreover, in accordance with an example embodiment of the present invention, a computer program product is provided which includes instructions which, upon execution of the program by a computer, prompt it to execute the above described method.

In addition, the present invention provides a machine-readable storage medium, which includes instructions, which, when the program is executed by a computer, prompt it to execute the above described method(s).

Moreover, the present invention provides a system for determining a movement of the system relative to at least one object. In accordance with an example embodiment of the present invention, this system has a device for recording digital image sequences of objects. Such a device for recording digital image sequences may be a digital camera, for example, a digital video camera. Furthermore, the system has an evaluation unit which is coupled to the device in such a way that the image sequences are transferred to the evaluation unit. This may be accomplished by a bus system, for example, which couples the device for recording digital image sequences to the evaluation unit. In this context, the evaluation unit is adapted to implement the above described method according to the present invention and to make the result of the method available at an output of the evaluation unit.

Figure 1:
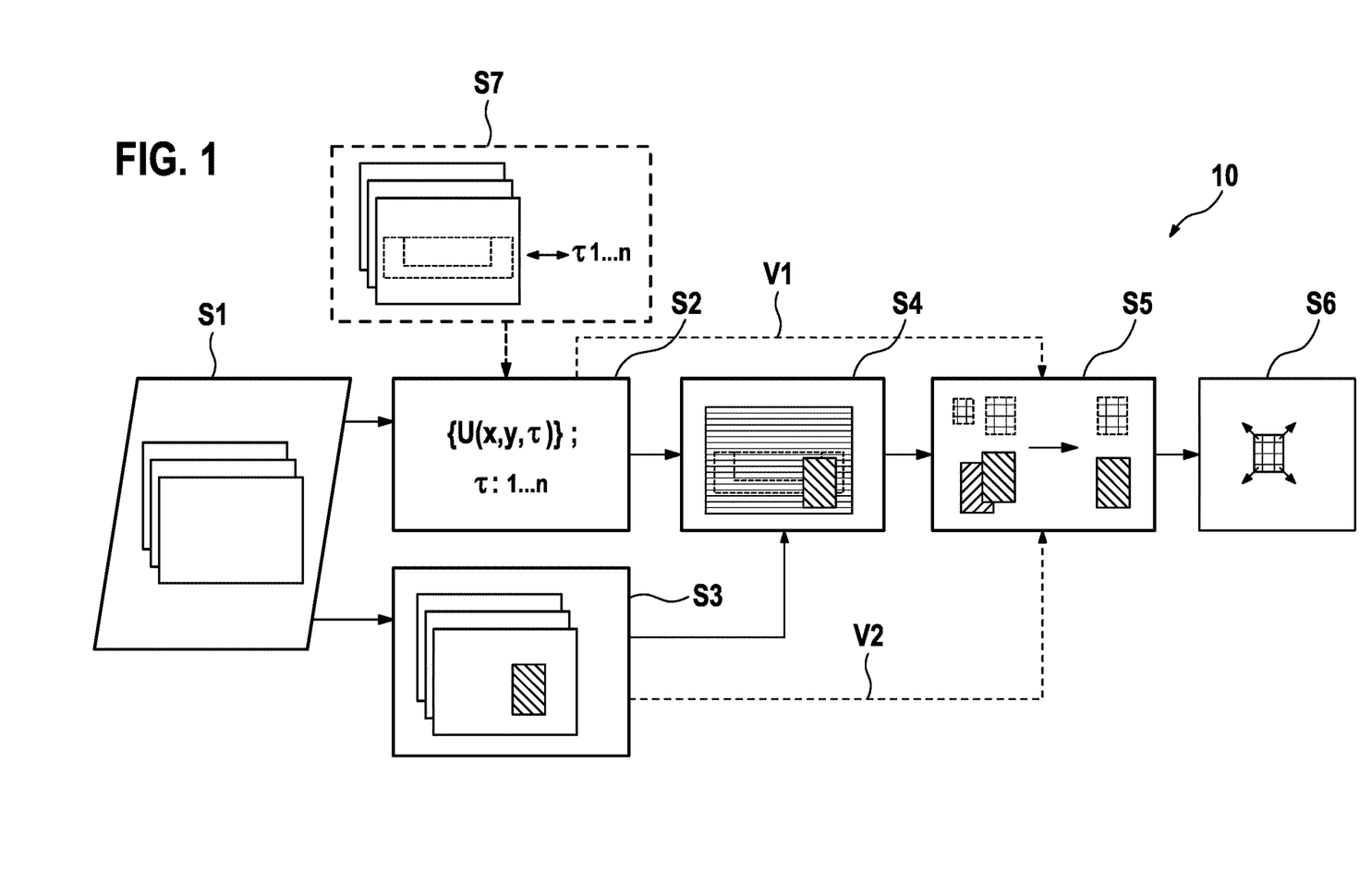
FIG. 1 shows a flow chart of a method for determining a movement of a device relative to at least one object, in accordance with an example embodiment of the present invention.
Figure 2:
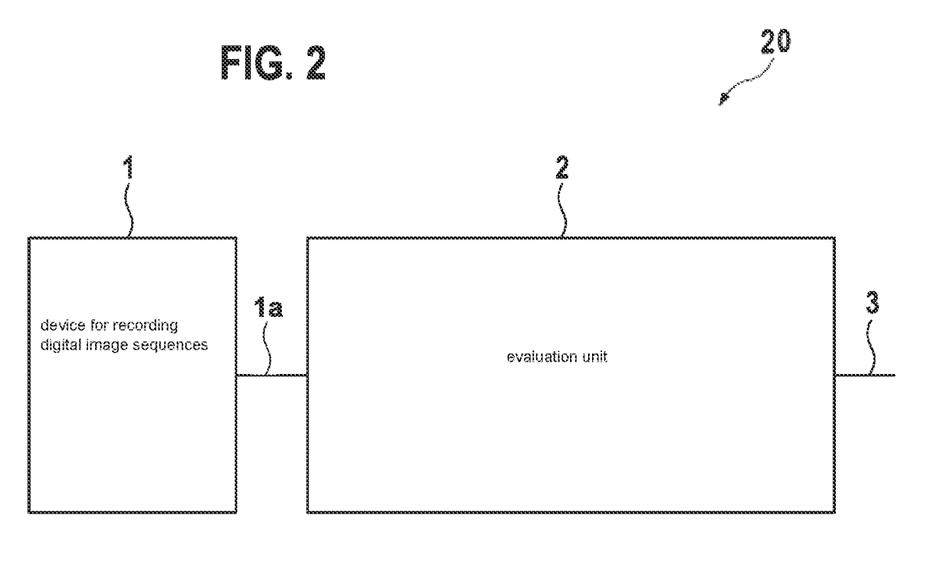
FIG. 2 shows a system for determining a movement of a device relative to at least one object, in accordance with an example embodiment of the present invention.

Exemplary embodiments of the present invention are shown in FIGS. 1 and 2 and are described in greater detail below.

DETAILED DESCRIPTION OF EXAMPLE EMBODIMENTS

Flow chart 10 in FIG. 1 illustrates the method steps for determining a movement of a device relative to at least one object.

A sequence of digital images is provided S1 for the method, both for computing a flow field $\{U(x,y,T)\}$ S2 and for finding the position of an object S3.

A plurality of optical flow fields $\{U(x,y,T)\}$ are computed in step S2 of the exemplary embodiment of the method according to the present invention. In the process, each flow field $\{U(x,y,T)\}$ is formed from a set of flow vectors U, which are assigned to coordinates x and y of an image, respectively. Flow vectors U are computed from image pairs of the sequence of digital images at a time interval T. Individual flow fields $\{U(x,y,T\}$ are computed at a plurality of different time intervals $\tau$: i . . . n from a most current image and from current images of the image sequence.

Step S7 is an optional refinement of the exemplary embodiment. Step S7 is advanced to precede step S2, the computation of a plurality of flow fields. Only an image detail of the images of the image pairs is used as the basis for computing the plurality of the optical flow field in S2, thus the image detail representing a partial area of the particular images. Thus, as indicated in FIG. 1 in step S7, a smaller image detail is specified in step S7 for the plurality of flow field computations.

Thus, as described above, an area, such as a sky, for example, may be masked out of an image that is not relevant for estimating the change in scale, whereby the computational outlay is reduced.

To compute the plurality of optical flow fields in step S2, another alternative embodiment of the present invention provides in step S7 that different time intervals be specified for distinguishable details of the images of the image pairs.

This computation of the plurality of flow fields S2 may be performed for any number of image details and associated time intervals. As described above, this makes it possible for objects, which for reasons of perspective are shown to be smaller in the distance, to be fully detected by the partial image region thereof, via a smaller image detail already during the flow field computation. In this way, the computational outlay needed to compute the flow fields is reduced, and the accuracy of the change in scale estimation is improved by the possible assignment of longer time intervals for more distant objects. To improve the response time, the time interval may then be selected to be shorter in the near range in which a partial image region of the object is shown in a larger size.

If the image details are configured in such a way that the partial image region, which is associated with the object whose position is found, covers a plurality of image details, the estimation from one image detail may be compared with the estimation from another image detail.

For example, in a typical application in a motor vehicle, three image regions of different values may be centered and nested in one another and the longest time interval thereby assigned to the smallest image detail, the shortest time interval to the largest, and a time interval, which is between the other two time intervals, to the medium image detail.

Thus, both for objects in the near as well as in the far range, the method according to the present invention makes possible a robust and accurate estimation of the change in scale, which may also be adapted to other circumstances.

In step S3, the position of at least one object is found in a partial image region of an image of the sequence of images, and the respective object is assigned to a partial region. The result of position finding S3 is a partial image region of an image of the sequence of images in which the position of the object was found and to which it was assigned.

In step S4, a partial flow field results in each case from an intersection of a computed flow field $\{U(x,y,T)\}$ with the at least one partial image region, out of which a plurality of partial flow fields are formed using the plurality of computed flow fields $\{U(x,y,T)\}$. In this context, each partial flow field is characterized by the time interval used to determine this flow field $\{U(x,y,T)\}$.

In step S5, a partial flow field is selected from this plurality of partial flow fields in accordance with a criterion, the estimation of a change in scale of the object being facilitated by the selection in accordance with a suitable criterion.

The criteria for this selection of at least one suitable partial flow field from the plurality of partial flow fields are based, on the one hand, on necessary conditions, to estimate a change in scale from a partial flow field, on the other hand, from quality considerations for the possibility of a robust and accurate estimation of the change in scale.

A necessary condition for a scale estimation using a partial flow field is a minimum value of the intersection between the computed flow field $\{U(x,y,T)\}$ and the partial image region in which the position of the object, such as a motor vehicle, for example, was found. This means that the intersection between the partial image region and the image detail must have an empirically determined minimum value, for example, to make possible a robust estimation of the change in scale. In this empirical determination, a compromise between the robustness of the estimation and the computing time to be used may also be taken into consideration.

Moreover, estimating a change in scale requires that this intersection of computed flow field $\{U(x,y,T)\}$ and the partial image region have a sufficient number of flow vectors for estimating the change in scale, which are used therefor.

When determining a sufficient number of flow vectors, it is also possible to use quality criteria, such as the signal-to-noise ratio or quality factors from the flow vector computation.

The quality criteria for selecting a partial flow field may relate to the flow vectors of the partial flow fields, to features of the object detection in the partial image region, and to features in the image detail.

The quality measure for selecting a partial flow field relates, in particular to the number of flow vectors in the partial flow field being considered, respectively to how densely the partial flow field is occupied by flow vectors, and to the quality value of the flow vectors, if it is determined and provided by the computation algorithm of the flow vectors. The quality value of the flow vectors may be provided by an optional data exchange V1 between the computation of the plurality of the flow fields in step S2 and the selection in step S5.

Furthermore, quality criteria may relate to features of the partial image region that result from the position finding of the at least one object. They include the detection quality or reliability, respectively probability of the position finding. In the selection in step S5, an optional data exchange V2 may take place between the object detection in step S3 and the selection of partial flow fields in step S5 in order for quality criteria to be considered from the object detection.

Features from the overlap region between the partial image region and the computed flow field, such as contrast, gray scale distribution, gradients, for example, the presence of specific features or also characteristics, which result from a histogram of oriented gradients HOG, i.e., from a consideration of the distribution of local intensities or of the configuration of edges, may be optionally included in the quality consideration.

Moreover, besides this simple heuristics, more complex methods, such as automated or learned classifiers, which are ascertained from the "machine learning" (for example, decision trees) or "deep learning," for example, "offline," may be used to select the most suited partial flow field.

Specific criteria or even all of the criteria may be used for selecting the most suited partial flow field as a function of the use of the inventive method and the available computational budget.

The following describes an example of selecting at least one partial flow field from the plurality of partial flow fields and the criteria used in order to estimate a change in scale of the object.

Each partial flow field for which the ratio of overlap area SZ of the intersection of partial image region and image detail relative to the total area of the partial image region is above a certain threshold value of, for example, 0.75 or for which overlap area SZ, i.e., the intersection of the partial image region and the computed flow field, is above a certain minimum value, is taken into account for the selection process.

The number of flow vectors FV is then determined from overlap area SZ for the thus selected partial flow fields. Moreover, maximum overlap area $SZ_{MAX}$ and the maximum number of flow vectors $FV_{MAX}$ in a respective overlap area SZ of one of the selected partial flow fields are also determined over all the considered partial flow fields.

The partial flow field having the longest time interval between the image pairs on which the computation is based, is then selected, which satisfies the following condition:

$$FV > \text{alpha} * (SZ/SZ_{MAX}) * PV_{MAX}$$

alpha being a weighting factor to be selected, which may be determined empirically, for example.

It is thus compared whether the number of flow vectors contained in the considered partial flow field is greater than the product of the ratio of overlap area SZ to maximum overlap area $SZ_{MAX}$ and the maximum number of flow vectors in one of the partial flow fields multiplied by alpha.

If a plurality of objects have been identified, the most suited flow field is selected separately for each overlap area.

In step S6, the change in scale is estimated following the selection of the most suited partial flow region. To estimate changes in scale S6, pairs of flow vectors are generated from the overlap area, in order to be able to quantify relative movements when objects move along the optical axis of the image acquisition system. In the case of a change in scale, a pixel in an image is typically imaged onto a plurality of pixels in another image and vice versa.

From such scaling changes, a collision time TTC (time-to-collision or time-to-contact) may then be derived as a characterizing parameter for the relative movement, especially between vehicles.

The described method may be realized by a computer program product which includes the instructions, which, upon execution of the program by a computer, prompt this computer to execute this method along with all of the optional forms thereof. This computer program may also be stored on a machine-readable storage medium.

FIG. 2 shows a system 20 for determining a movement of this system 20 relative to at least one object. This system has a device for recording digital image sequences 1 of objects, for example. Such a device for recording digital image sequences may be a digital camera or a digital video camera, for example. Moreover, system 20 has an evaluation unit 2 which is coupled to device 1 in such a way that the image sequences are transferred to evaluation unit 2. This may be accomplished by a bus system 1a, for example, which couples the device for recording digital image sequences 1 to evaluation unit 2. In this context, evaluation unit 2 is adapted to implement the above described inventive method and to provide the result of the method at an output 3 of the evaluation unit.

What is claimed is:

1. A method for determining a movement of a device relative to at least one object based on a digital image sequence of the object recorded from a location of the device, the method comprising the following steps:
   computing a plurality of optical flow fields from image pairs of the digital image sequence, the image pairs being formed from a most current image and images of the image sequence at different time intervals relative to the most current image;
   finding a position of at least one object in a partial image region in the most current image in each case and assigning the partial image region to the object;
   forming a plurality of partial optical flow fields from the plurality of optical flow fields, each of the partial flow fields resulting from an intersection of one of the flow fields of the plurality of flow fields with the partial image region of the most current image of the image sequence;
   selecting at least one of the partial flow fields from the plurality of partial flow fields in accordance with at least one criterion to facilitate an estimation of a change in scale of the object; and
   estimating the change in scale for the at least one object using the assigned partial image region based on the at least one of the selected partial flow fields and a time interval from the different time intervals.

2. The method as recited in claim 1, wherein the criterion for selecting the at least one of the partial flow fields takes into consideration a detection quality of a position finding of the object in the partial image region of the image of the image sequence and/or characteristics of the image regions in the intersection of the partial image region and the flow field.

3. The method as recited in claim 1, wherein the plurality of optical flow fields are computed from an image detail of images of the image pairs, the image detail representing a partial area of the images.

4. The method as recited in claim 1, wherein the plurality of optical flow fields are computed for at least two distinguishable image details of images of the image pairs and each at different time intervals.

5. The method as recited in claim 4, wherein the at least two distinguishable image details are configured on images of the image pairs relative to a configuration and value of the configuration in accordance with perspective aspects, for finding a position of objects at different distances from the device.

6. A method for determining a movement of a device relative to at least one object based on a digital image sequence of the object recorded from a location of the device, the method comprising the following steps:
   computing a plurality of optical flow fields from image pairs of the digital image sequence, the image pairs being formed from a most current image and images of the image sequence at different time intervals relative to the most current image;
   finding a position of at least one object in a partial image region in the most current image in each case and assigning the partial image region to the object;
   forming a plurality of partial optical flow fields from the plurality of optical flow fields, each of the partial flow fields resulting from an intersection of one of the flow fields of the plurality of flow fields with the partial image region of the most current image of the image sequence;
   selecting at least one of the partial flow fields from the plurality of partial flow fields in accordance with at least one criterion to facilitate an estimation of a change in scale of the object; and
   estimating the change in scale for the at least one object using the assigned partial image region based on the at least one of the selected partial flow fields,
   wherein the criterion for selecting the at least one of the partial flow fields takes into consideration a degree of overlap of the partial image region with the flow field and/or an absolute value of the intersection of the partial image region with the flow field.

7. A method for determining a movement of a device relative to at least one object based on a digital image sequence of the object recorded from a location of the device, the method comprising the following steps:
   computing a plurality of optical flow fields from image pairs of the digital image sequence, the image pairs being formed from a most current image and images of the image sequence at different time intervals relative to the most current image;
   finding a position of at least one object in a partial image region in the most current image in each case and assigning the partial image region to the object;
   forming a plurality of partial optical flow fields from the plurality of optical flow fields, each of the partial flow fields resulting from an intersection of one of the flow fields of the plurality of flow fields with the partial image region of the most current image of the image sequence;

selecting at least one of the partial flow fields from the plurality of partial flow fields in accordance with at least one criterion to facilitate an estimation of a change in scale of the object; and estimating the change in scale for the at least one object using the assigned partial image region based on the at least one of the selected partial flow fields, wherein the criterion for selecting the at least one of the partial flow fields takes into consideration a value of a signal-to-noise ratio of flow vectors of the partial flow field and/or a quality measure from a computation of the flow vectors and/or a number of flow vectors in the partial flow field and/or a length of the flow vectors of the partial flow field.

8. A method for determining a movement of a device relative to at least one object based on a digital image sequence of the object recorded from a location of the device, the method comprising the following steps:

computing a plurality of optical flow fields from image pairs of the digital image sequence, the image pairs being formed from a most current image and images of the image sequence at different time intervals relative to the most current image;

finding a position of at least one object in a partial image region in the most current image in each case and assigning the partial image region to the object forming a plurality of partial optical flow fields from the plurality of optical flow fields, each of the partial flow fields resulting from an intersection of one of the flow fields of the plurality of flow fields with the partial image region of the most current image of the image sequence;

selecting at least one of the partial flow fields from the plurality of partial flow fields in accordance with at least one criterion to facilitate an estimation of a change in scale of the object; and estimating the change in scale for the at least one object using the assigned partial image region based on the at least one of the selected partial flow fields, wherein the criterion for selecting the at least one of the partial flow fields requires the satisfaction of the following inequality:

$$FV > \text{alpha} * (SZ/SZ_{MAX}) * FV_{MAX}$$

wherein FV represents a flow vector, SZ represents an overlap area, $SZ_{MAX}$ represents a maximum overlap area, and $FV_{MAX}$ represents a maximum number of flow vectors, and additionally takes into consideration a value of a time interval used to compute the partial flow field.

9. A method for determining a movement of a device relative to at least one object based on a digital image sequence of the object recorded from a location of the device, the method comprising the following steps:

computing a plurality of optical flow fields from image pairs of the digital image sequence, the image pairs being formed from a most current image and images of the image sequence at different time intervals relative to the most current image;

finding a position of at least one object in a partial image region in the most current image in each case and assigning the partial image region to the object;

forming a plurality of partial optical flow fields from the plurality of optical flow fields, each of the partial flow fields resulting from an intersection of one of the flow fields of the plurality of flow fields with the partial image region of the most current image of the image sequence;

selecting at least one of the partial flow fields from the plurality of partial flow fields in accordance with at least one criterion to facilitate an estimation of a change in scale of the object; and estimating the change in scale for the at least one object using the assigned partial image region based on the at least one of the selected partial flow fields, wherein the plurality of optical flow fields are computed for at least two distinguishable image details of images of the image pairs and each at different time intervals, wherein the at least two image details are distinguishable by an area extent thereof, a smaller image detail is configured completely within a larger image detail, and a respectively assigned time interval for computing the flow fields is greater, the smaller the image detail is.

10. The method as recited in claim 9, wherein the plurality of optical flow fields are computed from image details of the image pairs, the image details and/or the assignment thereof to time intervals of the image pairs each being determined in accordance with a recording of the image sequence.

11. A non-transitory machine-readable storage medium on which is stored instructions for determining a movement of a device relative to at least one object based on a digital image sequence of the object recorded from a location of the device, the instructions, when executed by a computer, causing the computer to perform the following steps:

computing a plurality of optical flow fields from image pairs of the digital image sequence, the image pairs being formed from a most current image and images of the image sequence at different time intervals relative to the most current image;

finding a position of at least one object in a partial image region in the most current image in each case and assigning the partial image region to the object;

forming a plurality of partial optical flow fields from the plurality of optical flow fields, each of the partial flow fields resulting from an intersection of one of the flow fields of the plurality of flow fields with the partial image region of the most current image of the image sequence;

selecting at least one of the partial flow fields from the plurality of partial flow fields in accordance with at least one criterion to facilitate an estimation of a change in scale of the object; and estimating the change in scale for the at least one object using the assigned partial image region based on the at least one of the selected partial flow fields and a time interval from the different time intervals.

12. A system for determining a movement relative to at least one object, comprising:

a device configured to record digital image sequences of the at least one object; and an evaluation unit, coupled to the device in such a way that the image sequences are transferred to the evaluation unit, wherein the evaluation unit is configured to determine the relative movement based on a digital image sequence of the digital image sequences, the evaluation unit configured to:

compute a plurality of optical flow fields from image pairs of the digital image sequence, the image pairs being formed from a most current image and images of the image sequence at different time intervals relative to the most current image;

find a position of at least one object in a partial image region in the most current image in each case and assigning the partial image region to the object;

form a plurality of partial optical flow fields from the plurality of optical flow fields, each of the partial flow fields resulting from an intersection of one of the flow fields of the plurality of flow fields with the partial image region of the most current image of the image sequence;

select at least one of the partial flow fields from the plurality of partial flow fields in accordance with at least one criterion to facilitate an estimation of a change in scale of the object; and estimate the change in scale for the at least one object using the assigned partial image region based on the at least one of the selected partial flow fields and a time interval from the different time intervals.

* * * * *